Patented Dec. 18, 1934

1,984,415

UNITED STATES PATENT OFFICE 1,984,415

PREPARATION OF CYANHYDRINS

Alexander Douglas Macallum, Niagara Falls, N. Y., assignor to E. I. du Pont de Nemours & Company, Inc., Wilmington, Del., a corporation of Delaware No Drawing. Application May 26, 1933
Serial No. 673,110

18 Claims. (Cl. 260—99.30)

This invention relates to the manufacture of organic cyanogen compounds, and more particularly to the preparation of aliphatic cyanhydrins.

It is well known that hydrocyanic acid reacts with aliphatic aldehydes and ketones to form the corresponding cyanhydrins. In the absence of catalysts, this reaction is slow, often requiring ten to fifteen days to reach completion at ordinary temperatures; in the presence of a small amount of moisture and an alkaline material, the reaction proceeds vigorously with the evolution of considerable heat. If the temperature is not controlled, losses are likely to occur through decomposition and/or polymerization of the reactant and product, and in some cases the reaction is likely to attain an explosive violence. One method of preventing such an excessive temperature rise is to carry out the reaction in aqueous solution. However, this method is inefficient because the cyanhydrins are hydrolyzed to a greater or less extent in the presence of appreciable amounts of water. In small scale operation; for example, in laboratory practice, the reaction may be carried out by mixing hydrocyanic acid with the aldehyde or ketone in equimolecular amounts and adding a small amount of catalyst material to the mixture. If the total quantity of reaction material does not exceed around 1 liter, it is possible to control the reaction by efficient cooling, with fairly satisfactory results in most cases. However, this method is not suited for commercial production where large quantities of materials are reacted, and where efficient cooling throughout the entire mass of reaction material is difficult to attain.

It also has been proposed to control the temperature of the reaction by using a large excess of liquid hydrocyanic acid as the reaction medium. According to this proposed method, a small amount of catalyst is added to the liquid hydrocyanic acid and the aldehyde or ketone is slowly added thereto continuously or intermittently while the reaction mixture is cooled. This method has a number of disadvantages. It is necessary in such a case to maintain the reaction mixture below the boiling point of liquid hydrocyanic acid which definitely limits the temperature range in which reaction may be allowed to occur. Hydrocyanic acid is readily polymerized also, especially in the presence of the alkaline materials which are used as catalysts, even at low temperatures. Such polymerization is in the nature of an autocatalytic, exothermic reaction and when once started is difficult to control and may occur with explosive violence. Furthermore, the method is unsuited for commercial practice because of the difficulty and hazard entailed in handling large quantities of liquid hydrocyanic acid under conditions which favor its decomposition or polymerization.

An object of this invention is to provide a safe and economical method for reacting hydrocyanic acid with aliphatic aldehydes or ketones to produce the corresponding liquid cyanhydrins. Another object is to provide a method for effectively controlling the temperature of the reaction between hydrocyanic acid and an aldehyde or a ketone and in so doing to prevent loss of the reactants. A further object is to prevent decomposition and/or polymerization of hydrocyanic acid in such reactions. Other objects will be hereinafter apparent.

The foregoing objects are attained by employing the cyanhydrin itself as a solvent medium for the reaction between the hydrocyanic acid and the aldehyde or ketone.

One method of carrying out my invention will serve as an illustration thereof. A quantity of the liquid cyanhydrin which is to be prepared is placed in a vessel together with a small amount of a suitable catalyst. An alkaline material may be used as a catalyst, for instance, around one-tenth of one percent of alkali metal cyanide. A small amount of moisture should also be present, as the reaction does not readily occur under absolutely anhydrous conditions. The amount of water necessary may vary from a mere trace to larger amounts; in general, the amount of water should not be so large as to cause substantial hydrolysis of the cyanhydrin. I prefer to use not over one percent by weight of water in the reaction mixture. The hydrocyanic acid and the aldehyde or ketone which is to be reacted therewith are added either continuously or intermittently in small amounts in approximately equimolecular proportions to the liquid. During the addition of the reactants, the temperature is preferably maintained at 15 to 50° C. After the addition of the reactants is completed, the temperature preferably is allowed to rise to a higher temperature in the range between 30 and 100° C. and is maintained at the higher temperature until the reaction is completed. Usually most of the reaction occurs during the period of addition of the reactants, and it is during this period that the temperature must be carefully controlled to prevent excessive rise in temperature. The temperature during this period of addition is controlled by the application of cooling means and by varying the rates of addition of the reactants. After the reactants have been added, the temperature is easily controlled by ordinary cooling means.

If desired, the crude product obtained may be purified by any suitable method, for instance, by vacuum distillation in the presence of an acid. The methods of purifying cyanhydrins are well known in the art and need no description here. In many cases, for example, when the cyanhydrin is to be subsequently used for the preparation of an hydroxy acid, purification of the cyanhydrin may be dispensed with.

The following example further illustrates my invention:

*Example*

Two hundred and fifty grams of lactonitrile (the cyanhydrin of acetaldehyde) was placed in a container provided with a reflux condenser and a stirring device and cooled by immersion in a bath of cold water. A quantity of finely powdered sodium cyanide equal to about 0.1% of the weight of the cyanhydrin was added. While the cyanhydrin was constantly agitated, 570 grams of liquid hydrocyanic acid and 880 grams of acetaldehyde were slowly added thereto during a period of 75 minutes. The hydrocyanic acid and acetaldehyde were added in separate streams at such rates that the temperature in the reaction vessel was maintained at around 18 to 21° C. After addition of the reactants was completed, a specific gravity test indicated that the reaction mixture contained about 43% by weight of lactonitrile. The temperature of the reaction mixture then was allowed to increase to from 40 to 44° C. and held at that temperature range for about 90 minutes. At the end of this time, a specific gravity measurement showed that the reaction mixture contained approximately 99% by weight of lactonitrile. The crude product was acidified and distilled in vacuo. The distillate thus recovered was equivalent to 97.9% yield on the acetaldehyde used.

My invention is not restricted to the exact procedures described above and illustrated by the above example, since various modifications may be made without departing from the spirit and scope thereof. The essence of my invention is the provision of a sufficient quantity of the liquid cyanhydrin at the beginning of the reaction to absorb the heat produced and thus aid in effecting proper temperature control. The amount of the liquid cyanhydrin initially required will vary depending upon the magnitude of the equipment employed, quantities of material to be reacted within a given time, the reaction temperature desired, and the effectiveness of the cooling means employed. My process is well adapted for continuous operation, since the cyanhydrin containing varying amounts of unreacted hydrocyanic acid and aldehyde or ketone may be continuously removed from the reaction vessel and continuously flowed through or into another container or conduit where the proper temperature is maintained to complete the reaction. Another method of practicing my invention comprises dissolving hydrocyanic acid and aldehyde or ketone in separate quantities of cyanhydrin and mixing the two solutions by flowing one into the other or flowing both together at the rate required to maintain the desired reaction temperature. Various other methods of carrying out my invention will be apparent to the chemical engineer.

The essential feature of my invention is that the contact of the reactants with the catalyst shall occur in the presence of sufficient cyanhydrin in the liquid phase to prevent excessive rise in temperature. Thus, the catalyst may be added to the liquid cyanhydrin and the aldehyde or ketone and hydrocyanic acid may be mixed and the mixture added to the cyanhydrin or the reactants may be added to the cyanhydrin in separate streams. Or, if desired, the catalyst may be added to one of the two reactants and the reactants then added to the cyanhydrin in separate streams.

While I prefer to add the reactants in approximately equimolecular proportions, other proportions may be used. In such cases, an excess of one of the reactants remaining in the reaction mixture may readily be separated by known methods, for instance, by distillation. The reactants may be added either as liquids or as gases, e. g., by passing their vapors into the cyanhydrin; they also may be dissolved in cyanhydrin or other suitable solvent prior to introduction into the reaction vessel. The temperature of the reaction may be varied within wide limits; I prefer to operate at between 15 and 100° C. In general, if the reaction is carried out much below 10 to 15° C. it becomes too slow for practical purposes. At temperatures above 100° C., temperature control becomes more difficult and requires special means for cooling and for the prevention of loss of the volatile reactants. Furthermore, in most cases there is no advantage in operating the reaction at temperatures above 100° C.; in most cases, the reaction may be advantageously carried out at temperatures between 20 and 50° C. However, if desired, the reactions may be carried out at elevated temperatures, using pressures above one atmosphere if necessary, provided that the temperature does not reach the point where the cyanhydrin is decomposed to a substantial extent. As is well known, cyanhydrins are decomposed in the presence of alkaline catalysts at elevated temperatures; in most cases, such decomposition does not occur extensively below 100° C. at a pressure of 1 atmosphere. Hence, in each case the limiting upper temperature will depend upon the decomposition temperature of the particular cyanhydrin present.

Although my process depends upon the employment of a liquid cyanhydrin as solvent medium, the invention is not restricted to the production of cyanhydrins which are liquid at ordinary temperatures, i. e., 30° C. or lower. The process is suitable for preparing any aliphatic cyanhydrin which will be liquid under reaction conditions. In other words, my process is suitable for producing any cyanhydrin which may be maintained in the liquid phase without substantial decomposition. As pointed out above, the reaction may be carried out at elevated temperatures, provided the temperature is maintained below the decomposition point of the cyanhydrin.

My invention is applicable to the preparation of any of the aliphatic cyanhydrins which may be maintained in the liquid state under suitable operating conditions without substantial decomposition. For example my invention may be used to prepare the cyanhydrins of aldehydes and ketones such as acetaldehyde and acetone.

It is also suitable for the preparation of cyanhydrins of the aryl derivatives of such aldehydes and ketones; e. g., the cyanhydrins of benzyl methyl ketone (C₆H₅CH₂COCH₃), or phenyl acetaldehyde (C₆H₅CH₂CHO) and also cyanhydrins of mixed aromatic-aliphatic ketones; e. g., acetophenone (C₆H₅COCH₃). Throughout this specification and in the appended claims, the term "aliphatic cyanhydrin" is used to include the cyanhydrins of such aryl substituted aliphatic aldehydes or ketones and mixed aromatic-aliphatic aldehydes or ketones.

If desired, the reaction mixture may be diluted by the addition of other solvents which have solvent action on the reactants and product and which do not react therewith under the reaction conditions. However, there is no particular advantage in the addition of other solvents.

Inorganic materials having a distinctly alkaline reaction in aqueous solution are suitable for catalysts in my process. For example the following compounds have a catalytic effect: oxides and hydroxides of the alkali and alkaline earth metals, alkali metal cyanides, alkali metal carbonates, ammonia, and alkaline salts such as Na₂HPO₄.

My process produces cyanhydrins in excellent yields with very little decomposition or pilymerization of the reactants or products. My invention makes possible effective temperature control over a wide temperature range and hence results in the avoidance of loss of the volatile reactants, decomposition and/or polymerization of the reactants, and decomposition of the cyanhydrins. My method avoids the employment of large quantities of liquid hydrocyanic acid in the presence of catalysts and under temperature conditions at which this substance is likely to be decomposed or polymerized and also avoids the hazards involved in handling large amounts of liquid hydrocyanic acid under such unfavorable conditions. A further advantage of my invention is that it provides a practicable continuous process for manufacturing a cyanhydrin.

I claim:

1. A process for preparing an aliphatic cyanhydrin comprising reacting hydrocyanic acid and a compound of the group comprising aliphatic aldehydes and ketones in said cyanhydrin in liquid state in the presence of a catalyst capable of accelerating the reaction at a temperature below the thermal decomposition point of said cyanhydrin.

2. A process for preparing lactonitrile comprising reacting hydrocyanic acid and acetaldehyde in lactonitrile in the presence of a catalyst capable of accelerating the reaction.

3. A process for preparing an alphatic cyanhydrin comprising reacting hydrocyanic acid and a compound of the group comprising aliphatic aldehydes and ketones in said cyanhydrin in liquid state in the presence of a catalyst capable of accelerating the reaction at a temperature below 100° C. to cause partial reaction and thereafter increasing the temperature thereof to a point below the thermal decomposition point of said cyanhydrin to substantially complete the reaction.

4. A process for preparing lactonitrile comprising reacting hydrocyanic acid and acetaldehyde in lactonitrile in the presence of a catalyst capable of accelerating the reaction at a temperature below 100° C. to cause partial reaction and thereafter maintaining the temperature thereof within the range of 30 to 100° C. to substantially complete the reaction.

5. A process for preparing an aliphatic cyanhydrin comprising providing a body of an aliphatic cyanhydrin in liquid state, agitating the same and adding thereto hydrocyanic acid and a compound of the group comprising aliphatic aldehydes and ketones in approximately equimolecular proportions in the presence of a catalyst capable of accelerating the reaction while maintaining the temperature of the reaction mixture below the thermal decomposition point of said cyanhydrin until the reaction is substantially complete.

6. A process for preparing an aliphatic cyanhydrin comprising providing a body of an aliphatic cyanhydrin in liquid state and adding thereto hydrocyanic acid and a compound of the group comprising aliphatic aldehydes and ketones in the presence of a catalyst capable of accelerating the reaction.

7. A process for preparing an aliphatic cyanhydrin comprising providing a body of said cyanhydrin in liquid state and adding thereto hydrocyanic acid and a compound of the group comprising aliphatic aldehydes and ketones in approximately equimolecular proportions in the presence of a catalyst capable of accelerating the reaction.

8. A process for preparing an aliphatic cyanhydrin comprising providing a body of said cyanhydrin in liquid state and adding thereto hydrocyanic acid and a compound of the group comprising aliphatic aldehydes and ketones in approximately equimolecular proportions in the presence of a catalyst capable of accelerating the reaction while maintaining the temperature of the reaction mixture below the thermal decomposition point of said cyanhydrin.

9. A process for preparing an aliphatic liquid cyanhydrin comprising providing a body of said cyanhydrin in liquid state and adding thereto hydrocyanic acid and a compound of the group comprising aliphatic aldehydes and ketones in approximately equimolecular proportions in the presence of a catalyst capable of accelerating the reaction and at such rate that the temperature of the reaction mixture is maintained below the thermal decomposition point of said cyanhydrin.

10. A process for preparing an aliphatic liquid cyanhydrin comprising providing a body of said cyanhydrin in liquid state and adding thereto hydrocyanic acid and a compound of the group comprising aliphatic aldehydes and ketones in approximately equimolecular proportions in the presence of a catalyst capable of accelerating the reaction while maintaining the temperature of the reaction mixture below 100° C.

11. A process for preparing an aliphatic liqiud cyanhydrin comprising providing a body of said cyanhydrin in liquid state and adding thereto hydrocyanic acid and a compound of the group comprising aliphatic aldehydes and ketones in approximately equimolecular proportions in the presence of a catalyst capable of accelerating the reaction while maintaining the temperature of the reaction mixture at 15° C. to 100° C. and thereafter maintaining the temperature of the reaction mixture at a temperature below the thermal decomposition point of the cyanhydrin until the reaction is substantially complete.

12. A process for preparing lactonitrile comprising providing a body of lactonitrile and adding thereto hydrocyanic acid and acetaldehyde in approximately equimolecular proportions in the presence of a catalyst capable of accelerating the reaction while maintaining the temperature of the reaction mixture below 100° C.

13. A process for preparing lactonitrile comprising providing a body of lactonitrile and adding thereto hydrocyanic acid and acetaldehyde in approximately equimolecular proportions in the presence of a catalyst capable of accelerating the reaction and at such rate that the temperature of the reaction mixture is maintained at 15° C. to 100° C.

14. A process for preparing lactonitrile comprising providing a body of lactonitrile and adding thereto hydrocyanic acid and acetaldehyde in approximately equimolecular proportions in the presence of a catalyst capable of accelerating the reaction while maintaining the temperature of the reaction mixture at 20 to 50° C. and thereafter maintaining the temperature of the reaction mixture at 30° C. to 100° C. until the reaction is substantially complete.

15. A process for preparing an aliphatic cyanhydrin comprising continuously adding hydrocyanic acid and a compound of the group comprising aliphatic aldehydes and ketones in the presence of a catalyst capable of accelerating the reaction to a cyanhydrin in the liquid phase.

16. A process for preparing an aliphatic cyanhydrin comprising continuously adding hydrocyanic acid and a compound of the group comprising aliphatic aldehydes and ketones in approximately equimolecular proportions to said cyanhydrin in liquid state in the presence of a catalyst capable of accelerating the reaction at a temperature below the thermal decomposition point of said cyanhydrin.

17. A process for preparing an aliphatic cyanhydrin comprising continuously adding hydrocyanic acid and a compound of the group comprising aliphatic aldehydes and ketones in approximately equimolecular proportions to said cyanhydrin in liquid state in the presence of a catalyst capable of accelerating the reaction at a temperature of 15 to 100° C., continuously removing the resulting reaction mixture and maintaining it at a temperature below the thermal decomposition point of said cyanhydrin until the reaction is substantially complete.

18. A process for preparing lactonitrile comprising continuously adding hydrocyanic acid and acetaldehyde in approximately molecular proportions to lactonitrile in the presence of a catalyst capable of accelerating the reaction at a temperature of 20 to 50° C., continuously removing the resulting reaction mixture and maintaining it at a temperature of 30 to 100° C. until the reaction is substantially complete.

ALEXANDER DOUGLAS MACALLUM.